United States Patent

[11] 3,626,226

[72] Inventors Edward M. Pauwels;
David D. Jordan, both of South Bend, Ind.
[21] Appl. No. 42,168
[22] Filed June 1, 1970
[45] Patented Dec. 7, 1971
[73] Assignee The Bendix Corporation

[54] WHEEL SPEED SENSOR FOR AN ADAPTIVE BRAKING SYSTEM
4 Claims, 17 Drawing Figs.

[52] U.S. Cl. .................................................. 310/168, 310/77
[51] Int. Cl. ........................................................ H02k 17/42
[50] Field of Search .......................................... 310/78–82, 92, 168–171, 112, 114, 120, 121, 91; 73/529; 74/11–13; 324/174; 179/100.2 T; 295/36, 43; 105/61, 217, 118, 215 C; 108/55; 317/5; 303/20, 21

[56] References Cited
UNITED STATES PATENTS

| | | | |
|---|---|---|---|
| 3,447,838 | 6/1969 | Haviland ..................... | 188/181 |
| 3,492,518 | 1/1970 | Wayne ......................... | 310/168 |
| 3,470,408 | 9/1969 | Lewis ........................... | 310/168 |
| 3,469,135 | 9/1969 | Haviland ..................... | 310/170 |
| 3,509,395 | 4/1970 | Schrecongost ............... | 310/168 |
| 1,797,579 | 3/1931 | Hoffman ...................... | 74/12 |

FOREIGN PATENTS

| | | | |
|---|---|---|---|
| 1,336,035 | 7/1963 | France ......................... | 310/168 |

*Primary Examiner*—D. F. Duggan
*Assistant Examiner*—R. Skudy
*Attorneys*—William N. Antonis and Plante, Hartz, Smith and Thompson ABSTRACT: The tone wheel is a heavy walled steel stamping having a flanged central opening adapted for pressing on to a pilot turned on the outside surface of the wheel hub, and a cylindrical flange contiguous to the usual offset portion of the brake disc and having teeth formed on its inside surface. The spaces between the teeth are filled with adhesive nonmagnetic material so that the tooth tips and the nonmagnetic material provide a smooth unbroken cylindrical surface. A radial adjustment for establishing a predetermined clearance between a pickup and the tone wheel is provided by a generally rectangular projection on the back of the pickup which fits into an elongated slot in the pickup bracket. The output of the pickup is used to control the adaptive braking system.

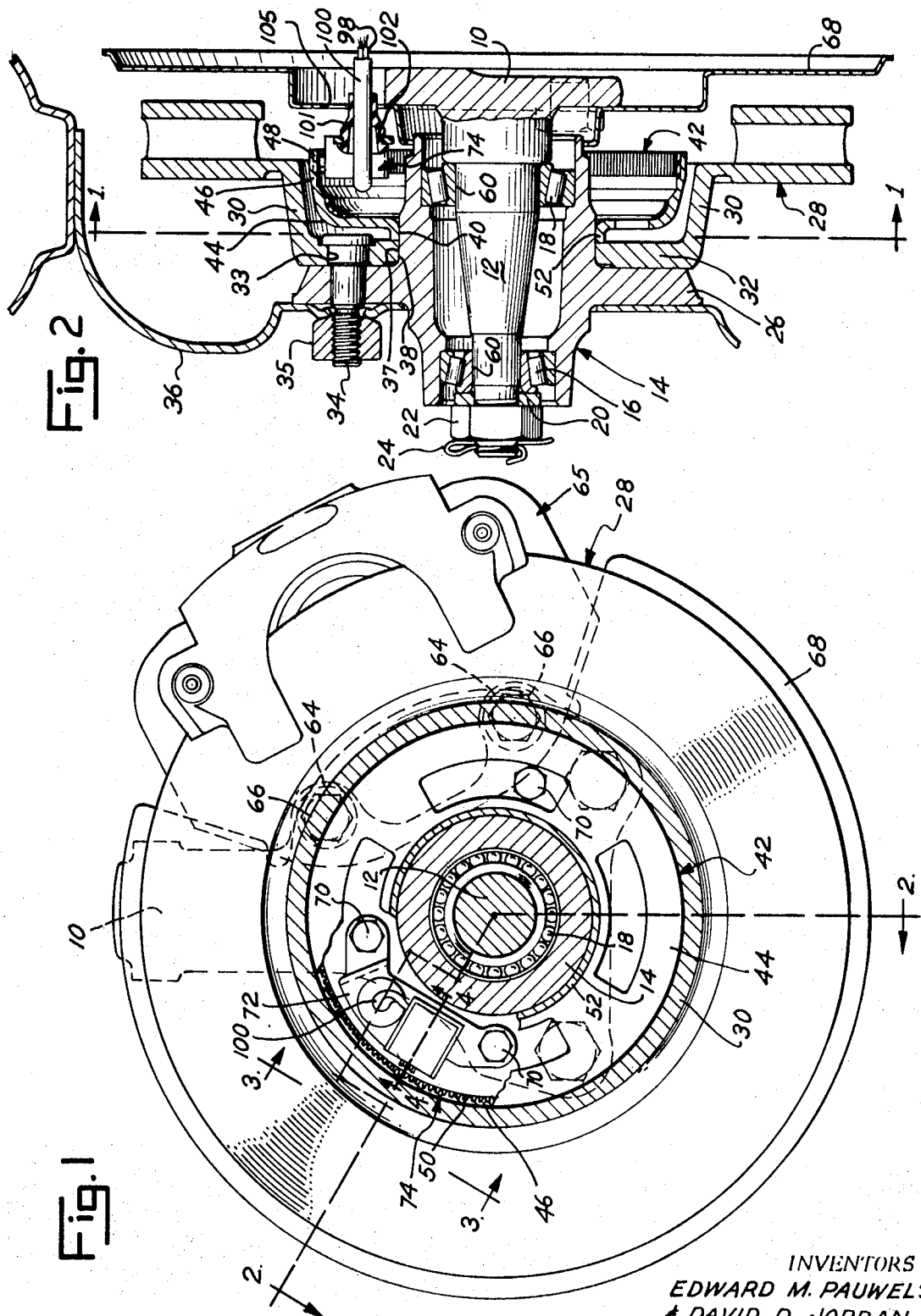

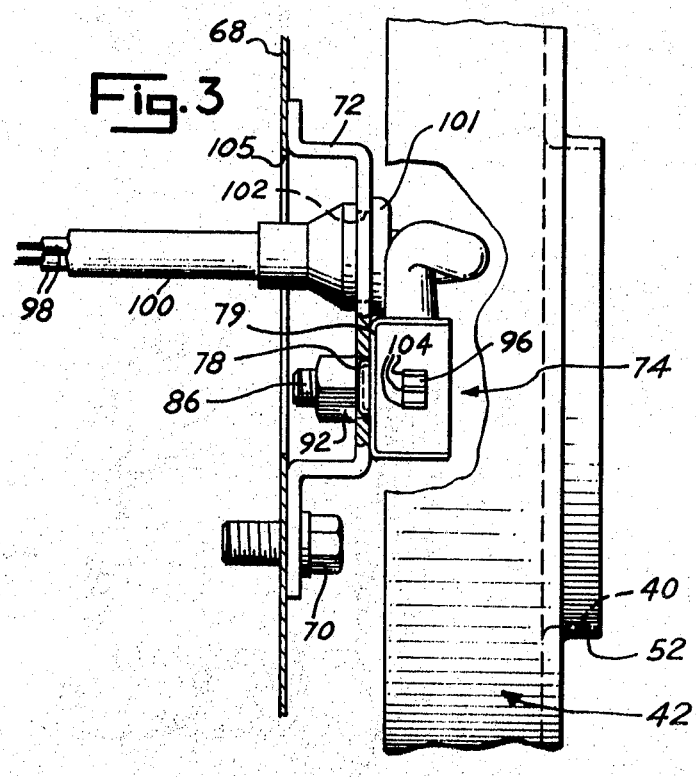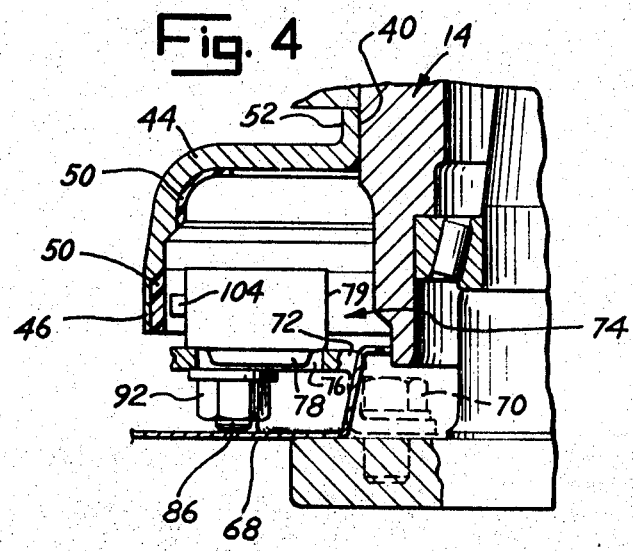

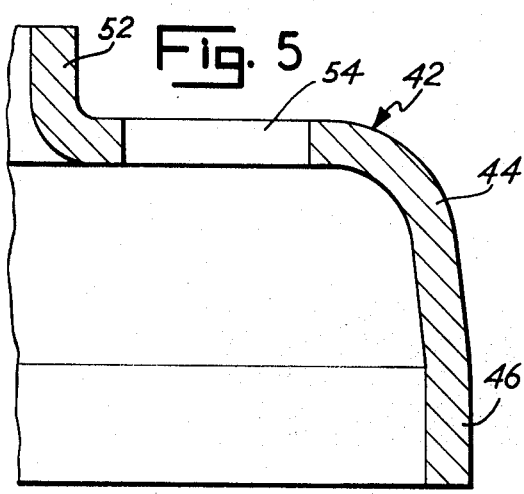
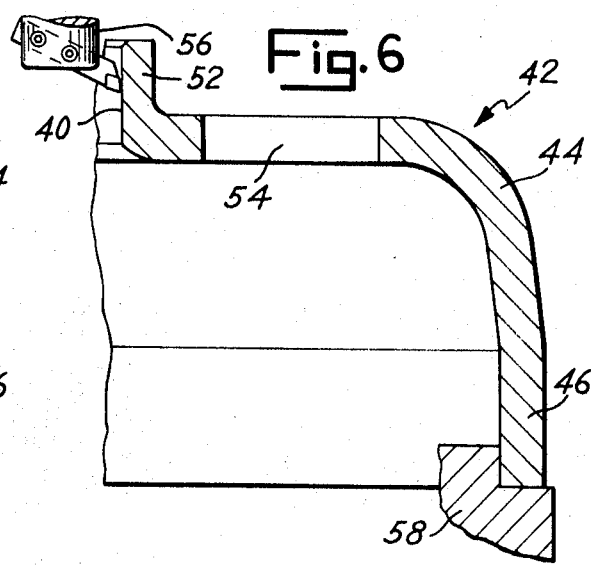
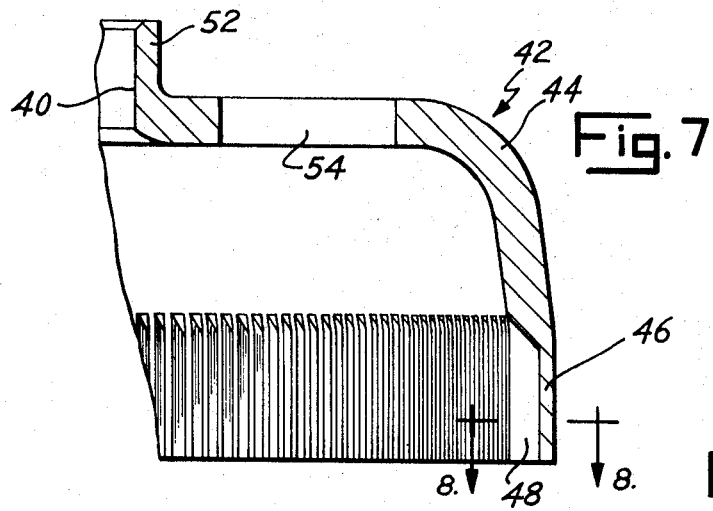
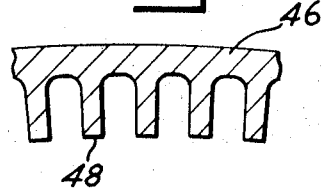
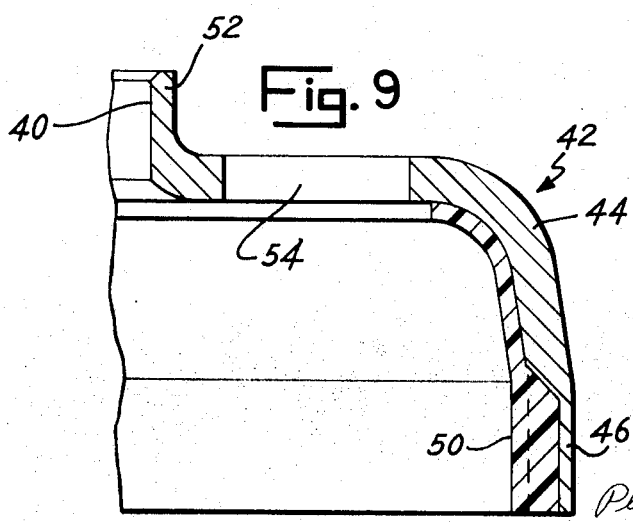

INVENTORS
EDWARD M. PAUWELS
& DAVID D. JORDAN
BY Plante, Hartz, Smith & Thompson
ATTORNEYS

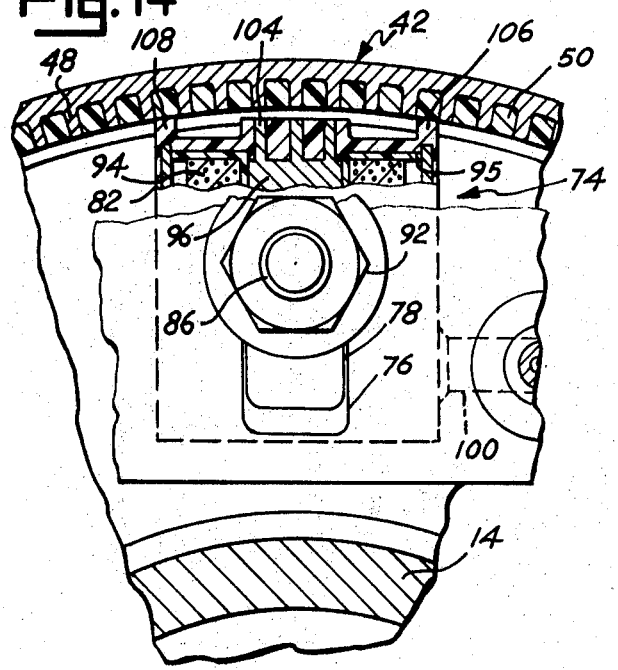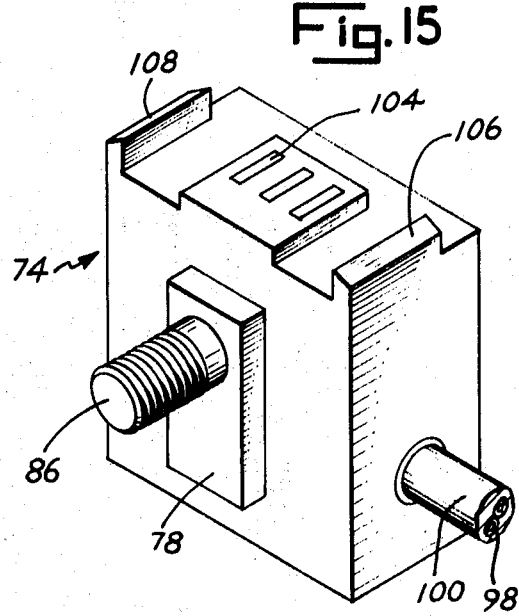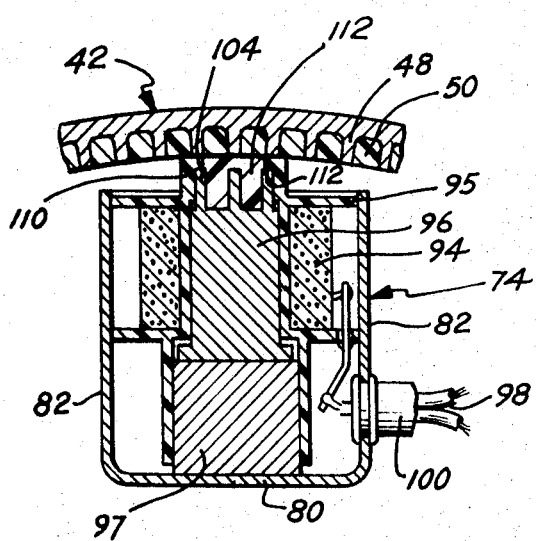

3,626,226

WHEEL SPEED SENSOR FOR AN ADAPTIVE BRAKING SYSTEM

SUMMARY OF THE INVENTION

This invention relates to an adaptive braking system for use on an automotive vehicle. More specifically, it relates to the speed sensor which provides the adaptive braking system with information relative to the speed and acceleration of one of the several wheels of an automotive vehicle. An adaptive braking system of the type in which the invention would be used is illustrated in U.S. Pat. No. 3,494,673. Wheel speed sensors of the same general class and of which this is an improvement are described in U.S. Application Ser. No. 42,396, filed June 1, 1970, having in common with this application the same assignee.

An object of the invention is to provide a wheel speed sensor of the "frictionless" type in which the components are of simple configuration, easy and economical to manufacture. The tone wheel must meet the basic requirements of having an adequate number of teeth or signal generating elements of sufficient mass of magnetic material to handle a large magnetic flux, and yet have adequate strength and proper protection against the hazards of the rather exposed environment, particularly when the vehicle is provided with disc brakes. The pickup and its mounting bracket provide a simple, reliable adjustment for the clearance between the pickup and the tone wheel.

Another object is to provide a wheel speed sensor particularly adapted for use on the front wheels of a vehicle equipped with disc brakes. In view of the probable optional nature of this equipment for the next several years, it is desirable that there should be no requirement for the vehicle to have special mounting provisions. For example, the tone wheel of the invention is adaptable to be pressed on to the same machined pilot which is formed on the front wheel hub to receive the brake disc, and the pickup bracket mounts under a pair of cap screws with which the brake dust shield is normally attached to the wheel spindle carrier. By using a heavy walled stamping with a flange pressed out of the central opening, the invention assures that the tone wheel will be mounted securely and will run free of wobble and eccentricity.

The same heavy walled stamping provides adequate metal in a cylindrical flange to form the teeth while leaving adequate metal in back of the teeth to provide a good flux path and to retain strength and structural integrity. By filling the spaces between the teeth with a nonmagnetic material, protection is provided against the possibility that stones or other hard objects may become wedged between the teeth and be carried forcefully into contact with the pickup with resultant damage.

As a feature of the invention, one method of assuring that the tone wheel runs without wobble or eccentricity is to press the rough formed tone wheel on to the wheel hub, and with the hub being rotated on its bearings, machine the tips of the teeth and the nonmagnetic material between the teeth so that the resulting smooth unbroken cylindrical surface is truly concentric and square with the axis of wheel rotation. If this method is adopted, the nonmagnetic material between the teeth of the tone wheel performs an additional or secondary function of helping the machining operation to be done without distorting the teeth and without excessive formation of burrs which would be very difficult and costly to remove from the somewhat massive assembly of wheel hub, brake disc and tone wheel.

While the invention has been described as being particularly applicable to the front wheel of automobiles, it should be understood that various features of the invention may also be applicable to rear wheel installation.

BRIEF DESCRIPTION OF THE DRAWINGS

FIG. 1 is an elevational view looking at the end of a front wheel spindle of a typical automotive vehicle with the wheel removed and parts in section along the line 1—1 of FIG. 2.

FIG. 2 is a sectional view taken along the line 2—2 of FIG. 1.

FIG. 3 is a sectional view taken along the line 3—3 of FIG. 1.

FIg. 4 is a sectional view taken along the line 4—4 of FIG. 1.

FIGS. 5, 6, 7, and 9 inclusive are partial sectional views, with sections taken along the axis of the tone wheel in successive stages of manufacture.

FIG. 8 is a sectional view along line 8—8 of FIG. 7.

FIGS. 14 and 15 are pictorial representations of a wheel speed pickup, mounted and unmounted, respectively, to illustrate the corner projections used to space and protect the polepiece from the tone wheel.

FIGS. 16 and 17 are alternate embodiments of FIGS. 14 and 15, respectively.

DETAILED DESCRIPTION OF THE INVENTION

Figure 10:
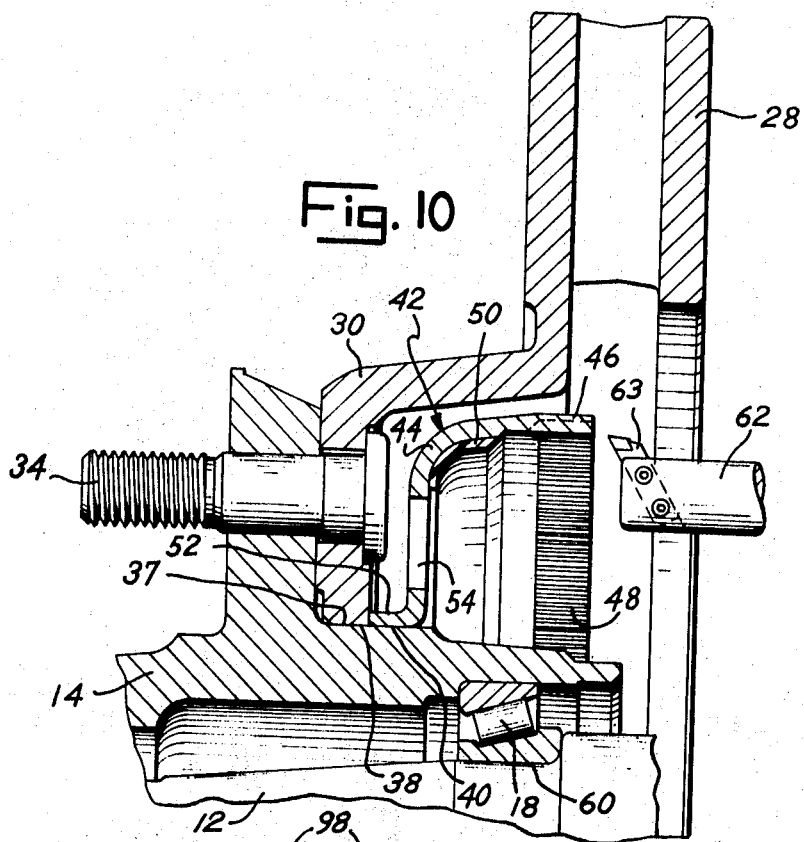
FIG. 10 is a partial sectional view taken along the axis of an assembly of wheel hub, brake drum and tone wheel illustrating the final stage of manufacture of the tone wheel.

Referring to the drawings, there is shown a conventional front wheel suspension including a spindle carrier 10 to which is bolted a spindle A wheel hub 14 is rotatably mounted on the spindle by tapered roller bearings 16 and 18 secured by the usual washer 20, castellated nut 22 and cotter pin 24. The hub 14 is provided with a wheel mounting flange 26. A ventilated brake disc 28 of normal configuration, including an offset portion 30 and a mounting flange 32, is secured to the inside face of the flange 26 by a series of bolts 34 which are pressed through aligned holes 33 in the two flanges 26 and 32. The threaded ends of the bolts project outwardly to receive the wheel 36 which is secured in place against the outer face of the flange 26 by nuts 35 threaded onto the bolts 34. The hub 14 is formed on its outer surface with a machined pilot 37 adapted to receive and centralize or align a large central opening 38 in the mounting flange 26 of the brake disc. As a feature of this invention, this pilot is made longer than the thickness of the mounting flange to provide space to receive a large central opening 40 in the tone wheel assembly which is designated generally by the numeral 42. The tone wheel assembly comprises a thick-walled, cup-shaped stamping 44 having a rim or cylindrical flange 46, the inner margin of which is formed with teeth 48 on its inner surface, and a molded adhesive nonmagnetic material 50 (shown in FIG. 9) filling the spaced between the teeth 48. The central opening 40 of the tone wheel assembly 42 is formed with a drawn-out mounting flange 52 to increase the surface in contact with the pilot 37 to insure that the tone wheel will press on securely and with proper alignment and squareness.

FIGS. 5 through 10 inclusive illustrate one successful method of manufacturing the tone wheel assembly 42 and assembling it to the wheel hub 14 and disc brake 28. FIG. 5 shows the thick walled stamped blank with the mounting flange 52 drawn out of the central opening 40. This blank may be made by conventional press operations. If desired, a series of openings 54 may be blanked in the bottom of the stamping 44 to reduce its weight and rotating inertia. FIG. 6 shows how the central opening 40 is machined by a turning operation with a boring bar 56 while the inside surface of the cylindrical flange 46 is held in the chuck 58 of a boring machine (not shown). This operation insures close tolerance on the diameter of the central opening 42 and good concentricity between said machined pilot 37 and the central opening 42. FIG. 7 shows how the teeth 48 are formed by a slotting operation and FIG. 8 illustrates the actual configuration of the teeth 48. FIG. 9 shows how the adhesive nonmagnetic material 50 is molded into the spaces between the teeth 48. It will be noted that an excess of material is molded to the inner surface of the cylindrical flange 46. FIG. 10 shows how the tone wheel 42 is pressed on the machined pilot 37 of the hub 14 and the excess of the nonmagnetic material 50 is machined away along with a few thousandths of an inch of material from the tips of the teeth 48 to insure they are all uniformly exposed and that the surface defined by the tooth tips and the material 50 is smooth and unbroken, therefore being truly square and concentric with the axis of the hub 14. It is desirable that the hub 14 be mounted with machine centers 60 located in the cones of the bearings 16 and 18 while the boring bar 62 is performing this turning operation. It is during this operation that the adhesive nonmagnetic material 50 performs its secondary function of supporting the rather delicate teeth 48 against being deformed by the pressure of the cutting tool 63 and of inhibiting the formation of burrs on the trailing edges of the teeth 48. The removal of such burrs would be a very painstaking operation requiring much costly hand labor. The material 50 is preferably a moldable plastic compound with high adhesive properties, which after molding becomes strong, hard and abrasion resistant. A suitable material can be found in the class of polymers known generally as epoxies.

Figure 11:
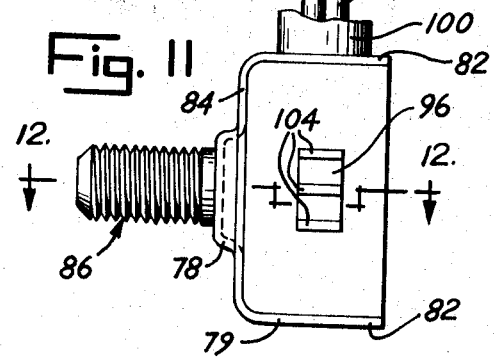
FIG. 11 is a view of the sensor element removed from the remaining portion of the wheel assembly.
Figure 12:
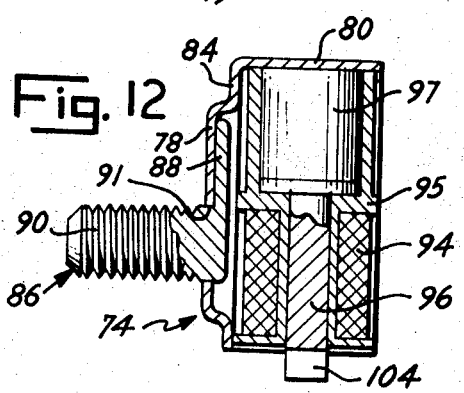
FIG. 12 is a sectional view taken on the line 12—12 of FIG. 11.
Figure 13:
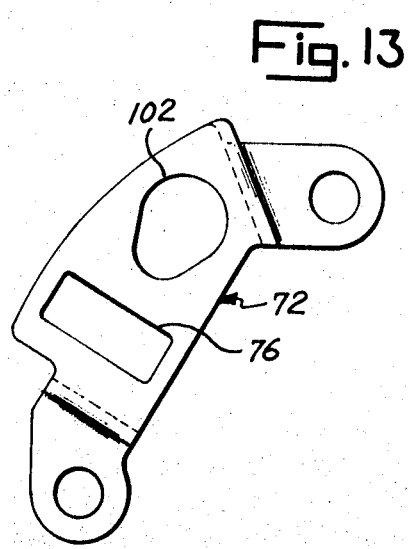
FIG. 13 is a view of the sensor mounting bracket.

Referring back to FIG. 1, the spindle carrier 10 is formed with a pair of ears 64 and a conventional caliper disc brake 65 is secured to them by a pair of cap screws 66. A brake protecting dust shield 68 is also secured to a spindle carrier by three cap screws 70. Two of the cap screws 70 also serve to attach a bracket 72 for a sensor pickup 74. This bracket 72 is illustrated in detail in FIG. 13 which clearly shows an elongated slot 76 which receives a generally rectangular projection 78 (see FIG. 11) formed on the back of the pickup 74. The pickup 74 includes a housing 79 in the form of a boxlike steel stamping having only an end 80, two sides 82 and a back 84 (see FIGS. 11 and 12). The projection 78 is embossed in the back 84 of the sensor housing 79 and a bolt 86 has its flattened head 88 welded to the inside of the projection 78 and its threaded stem 90 projecting out through a pierced hole 91. A nut and lockwasher assembly 92 threaded on to the stem of the bolt 86 serves to secure the pickup 74 in any desired position along the length of the slot 76 (see FIGS. 3 and 4). Within the housing 79 is a coil 94 of fine wire wound on a molded coil form 95 which also has coaxial recesses which hold a rectangular cross sectioned pole piece 96 and a cylindrical high energy permanent magnet 97. Leads 98 from a wiring harness 100 extend through a hole in one of the sides 82 and are suitably electrically connected to the ends, not shown, of the coil 94. A strain bushing 101 of elastomeric material, molded to the leads 98 is pressed into an opening 102 in the bracket 72. All of the parts 94 through 98 may be permanently secured in the housing 79 by potting with a castable compound such as epoxy resin. The pole piece 96 projects through the open end of the pickup housing 79, and its projecting end is formed with three teeth 104 of similar shape and equal spacing which teeth 104 are located in spaced apart relationship to the teeth 48 of the tone wheel 42. The brake dust shield 68 is provided with a suitably shaped opening 105 opposite the pickup bracket 72 to permit passing through the various parts of the wiring harness 100 and also to provide access to the nut and lock-washer assembly 92 in order to make a final adjustment of the relative positions of the pole piece 96 of the pickup 74 to the teeth 48 of the tone wheel 42 while the hub 14 and brake disc assembly 28 are in place.

It should be noted that the cylindrical flange 46 of the thick-walled stamping 44 is positioned contiguous to the offset portion 30 of the brake disc 28 which affords it much protection from impacts with large stones and other massive objects which occasionally are caused to fly around underneath a moving vehicle. Further, as a feature of the invention, the material 50 filling the spaces between the teeth 48 prevents them from picking up smaller stones which might otherwise become wedged between the teeth 48 so that they would be carried around by rotation of the wheel 36 into hard contact with the pickup 74 either damaging it or moving it out of its adjusted position.

Referring now to FIGS. 14 and 15, there is pictorially shown a sensor pickup 74 with projections 106 and 108 for adjusting the distance between the teeth 104 of the pole piece 96 and the teeth 48 of the tone wheel 42. During mounting, the projections 106 and 108 are brought into contact with the tone wheel 42. Because of the nonmagnetic material 50 filling the notches between the teeth 48, the projections will slide along the smooth surface of the tone wheel 42. The projections 106 and 108 automatically adjust the distance between teeth 48 and 104, and simultaneously protect the sensor pickup 74 against damage caused by normal deflections of the vehicle wheel. Other than the aspects just mentioned, the sensor pickup 74 is identical to the one previously described, and similar elements will be numbered the same.

FIG. 16 and 17 is a different embodiment of the idea presented in FIGS. 14 and 15. Instead of the projections 106 and 108, the molded coil form 95 is extended beyond the teeth 104 of the pickup 74 by tip 110. The space between the teeth 104 within the tip 110 is filled with a nonmagnetic material 112, whereby the tip 110 and nonmagnetic material 112 adjusts the distance between the teeth 104 and the teeth 48 and, simultaneously, protects the sensor pickup 74. FIG. 17 further illustrates the configuration of the molded coil form 95. Notice an inward flange 114 of the tip 110 determines the distance between teeth 48 and 104. Other than the previously noted differences, the same reference numerals applies to FIGS. 16 and 17.

In operation, rotation of the wheel 36 produces alternate alignment and nonalignment of the teeth 48 of the tone wheel 42 with the teeth 104 of the pickup pole piece 46. When the teeth 48 and 104 are aligned, greater magnetic flux passes through the teeth 104 than when they are not aligned. The changes in flux produces an alternating voltage in the coil 94 which is transmitted by the leads 98 and wiring harness 100 to suitable conventional computer means, not shown, of the adaptive braking system.

We claim:
1. A wheel speed sensor comprising:
a spindle;
a wheel hub rotatably mounted on said spindle;
disc brake means connected to said wheel hub and being rotatable therewith;
pickup means nonrotatably mounted on said spindle; and
a tone wheel connected to said hub and rotatable therewith, said tone wheel having notches on an accessible surface;
said pickup means being located in close proximity with said notches and movable relative thereto to generate a signal representative of the rotational velocity of said tone wheel;
said tone wheel being located in an offset portion of said disc brake means, both said tone wheel and said disc brake means being pressed on a pilot of said wheel hub and rotatable therewith.

2. A wheel speed sensor comprising:
a spindle;
a wheel hub rotatably mounted on said spindle;
disc brake means connected to said wheel hub and being rotatable therewith;
pickup means nonrotatably mounted on said spindle; and
a tone wheel connected to said hub and rotatable therewith, said tone wheel having notches on an accessible surface;
said pickup means being located in close proximity with said notches movable relative thereto to generate a signal representative of the rotational velocity of said tone wheel, and further comprising projections on said pickup means to locate said pickup means a predetermined distance from said tone wheel and to protect said pickup means from damage due to normal vibrations.

3. The wheel speed sensor, as recited in claim 2, wherein said projections are located on opposite sides of said pickup means to accurately set said predetermined distance.

4. The wheel sensor, as recited in claim 2, wherein said projections is an extension substantially surrounding the portion of said pickup means in close proximity with said notches, said extension slidably engaging said tone wheel to protect said pickup means and accurately set said predetermined distance.

Notice of Adverse Decision in Interference

In Interference No. 98,200, involving Patent No. 3,626,226, E. M. Pauwels and D. D. Jordan, WHEEL SPEED SENSOR FOR AN ADAPTIVE BRAKING SYSTEM, final judgment adverse to the patentees was rendered July 12, 1974, as to claims 2 and 3.

[*Official Gazette October 1, 1974.*]